United States Patent
Mani et al.

(10) Patent No.: US 7,950,011 B2
(45) Date of Patent: May 24, 2011

(54) LEVERAGING ADVANCED QUEUES TO IMPLEMENT EVENT BASED JOB SCHEDULING

(75) Inventors: Raghu Mani, Sunnyvale, CA (US); Jacco Draaijer, Belmont, CA (US); Eric Voss, Foster City, CA (US); Ravi Ramkissoon, Burlingame, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1593 days.

(21) Appl. No.: 11/247,500

(22) Filed: Oct. 10, 2005

(65) Prior Publication Data

US 2007/0083866 A1    Apr. 12, 2007

(51) Int. Cl.
*G06F 9/46* (2006.01)
(52) U.S. Cl. ...................................................... 718/102
(58) Field of Classification Search .................. 718/102
See application file for complete search history.

(56) References Cited

U.S. PATENT DOCUMENTS

| | | | |
|---|---|---|---|
| 5,402,350 A | 3/1995 | Kline | |
| 5,594,901 A | 1/1997 | Andoh | |
| 5,713,075 A * | 1/1998 | Threadgill et al. | 455/427 |
| 6,317,823 B1 | 11/2001 | Wakai et al. | |
| 6,988,102 B2 | 1/2006 | Rossiter et al. | |
| 6,988,139 B1 | 1/2006 | Jervis et al. | |
| 7,065,419 B2 | 6/2006 | Wu et al. | |
| 7,463,939 B1 | 12/2008 | Mata et al. | |
| 2005/0015619 A1 * | 1/2005 | Lee | 713/201 |
| 2005/0022198 A1 | 1/2005 | Olapurath et al. | |
| 2005/0097559 A1 | 5/2005 | He | |
| 2005/0223047 A1 | 10/2005 | Shah et al. | |
| 2005/0234575 A1 | 10/2005 | Wu et al. | |
| 2005/0234577 A1 | 10/2005 | Loughran et al. | |
| 2005/0251436 A1 | 11/2005 | Moffat et al. | |
| 2006/0106846 A1 | 5/2006 | Schulz et al. | |
| 2006/0107265 A1 | 5/2006 | Schulz et al. | |
| 2006/0129270 A1 | 6/2006 | Pankl et al. | |
| 2006/0190115 A1 | 8/2006 | Kuschel et al. | |
| 2006/0224254 A1 | 10/2006 | Rumi et al. | |
| 2006/0225075 A1 | 10/2006 | Mankovski et al. | |
| 2007/0005522 A1 | 1/2007 | Wren | |

OTHER PUBLICATIONS

"Queue", Microsoft Computer Dictionary, Fifth Edition. Microsoft Corporation, May 1, 2002.
Daigle, John. "Task-Oriented Queueing: An Analysis Tool for Software Design of Communication Processing Systems" Mar. 1986., IEEE Transactions on Communications, vol. COM-34.
Non-Final Office Action for U.S. Appl. No. 11/247,498 mailed Jan. 25, 2007.
Final Office Action for U.S. Appl. No. 11/247,498 mailed Aug. 28, 2007.
Non-Final Office Action for U.S. Appl. No. 11/247,498 mailed Apr. 7, 2008.
Final Office Action for U.S. Appl. No. 11/247,498 mailed Nov. 17, 2008.
Notice of Allowance for U.S. Appl. No. 11/247,498 mailed Mar. 24, 2009. Supplemental Notice of Allowance for U.S. Appl. No. 11/247,498 mailed Aug. 17, 2009.

* cited by examiner

*Primary Examiner* — Meng-Ai An
*Assistant Examiner* — Blake Kumabe
(74) *Attorney, Agent, or Firm* — Vista IP Law Group, LLP.

(57) ABSTRACT

A job scheduling technique that allows jobs to be launched as a result of messages which are not targeted specifically at the job, and for jobs to be interrelated in complex ways.

23 Claims, 9 Drawing Sheets

LEVERAGING ADVANCED QUEUES TO IMPLEMENT EVENT BASED JOB SCHEDULING

BACKGROUND AND SUMMARY

A job can be thought of as a combination of a program or command (i.e., what to do) and a schedule (i.e., when to do it). A job command can be any program within or outside a database, some examples include: shell scripts, executables, query language blocks, or stored procedures. Job scheduling can typically be set by a combination of date and time, a time interval, or upon receipt of a message. For example, an organization can schedule maintenance tasks to be executed daily at midnight to minimize the effect those tasks may have on user response.

The ability to schedule jobs at specific time intervals and upon the receipt of a message is helpful. However, many tasks in a database are interrelated. That is, when one task is executed another task should be executed, or similarly, when one task fails, another task is required. Current job scheduling techniques are limited in their ability to interrelate tasks or jobs and in their ability to schedule jobs based on non-job related state changes both inside and outside the database. Most current scheduling systems have a way of automatically starting a job when another one fails. However, none have a built-in way of starting a job based on a set of complex conditions. In current systems, in order to start a job based on complex conditions, the user must write a specific routine to detect the change in question and send a message to start the job.

A more sophisticated method of scheduling jobs is needed including scheduling jobs based on the status of another job and based on non-job related state changes.

A method of scheduling jobs may include creating a first job, and scheduling an event to trigger execution of the first job where the event is a state change of a second job. In another embodiment, a job scheduling system can include an event handler which enqueues events that occur in a database environment as messages in one or more queues, and a scheduler queue that manages messages based on jobs executing in the database environment.

DETAILED DESCRIPTION OF INVENTION

Job scheduling can typically be set only by a combination of date and time, a time interval, or upon receipt of a message whose sole purpose is to cause the job to start. This technique requires each job to be scheduled individually. Current job scheduling techniques limit the number of ways jobs may be interrelated. Presented in this disclosure is a job scheduling technique that allows jobs to be launched as a result of messages which are not targeted specifically at the job, and for jobs to be interrelated in complex ways.

In typical computing systems, job schedulers work within the computing system managing the schedule and executing jobs and database systems work within the computing system managing data. Job scheduler and database systems interact, but are distinct. This environment has disadvantages. One disadvantage of the job scheduler and database system being distinct is that the scheduler is unaware of state changes inside that database and that special mapping code needs to be written to bring such state changes to the attention of the scheduler. A second disadvantage is that the scheduler cannot make use of the various features that a database offers to enhance its ability to schedule jobs.

Figure 1A:
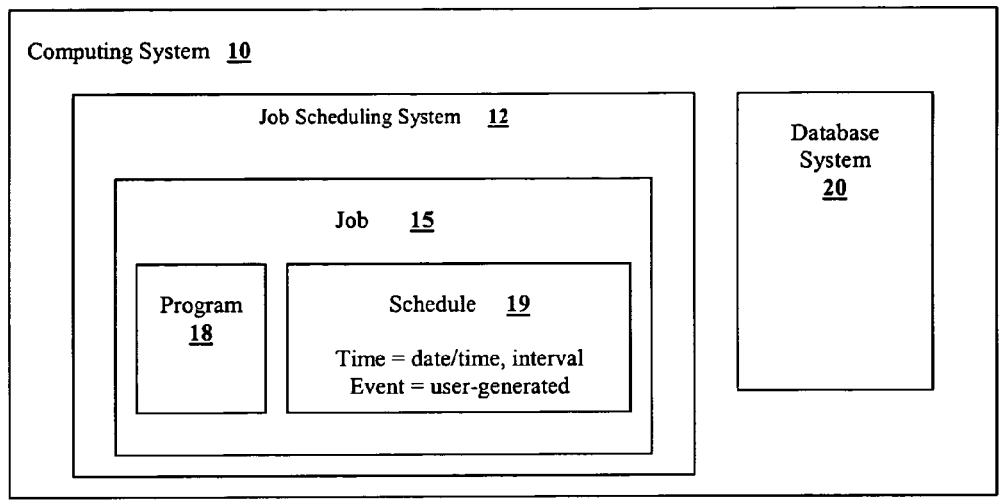
FIG. 1A is a representation of an embodiment of a job.

FIG. 1A shows a typical computing system 10, with job scheduling system 12 and database system 20. The job scheduling system 12 manages the schedule of many jobs, such as job 15. Job 15 includes program 18 and schedule 19. Schedule 19 can be based on date and time parameters or an event. For example, time and date parameters allow maintenance tasks to be scheduled to execute every Saturday at noon. Event parameters allow scheduling based on an event in the computing system, such as upon receipt of a file and are described in more detail below.

An event occurs when some Boolean condition has a state transition (i.e., changes from TRUE to FALSE or vice versa). In any computing environment there are many more state transitions than can be tracked. Therefore, henceforth, when the term 'event' is used, it refers to only those state changes that are of interest to jobs in the scheduling system and those that are being tracked in some way. In some embodiments, these events are messages received by the scheduler based on state changes external to the scheduling system that a user configured, and can be referred to as user-generated events. However, there is also a need to have jobs execute based on events of the scheduler itself, and other events in the database. Such events are referred to as scheduler-generated events and internal database events, respectively. An example of a job depending on a scheduler internal event includes the user wishing to launch another job to do some cleanup work after the failure of an earlier job. However, the event that the user is interested in may include a complex combination of conditions. For example, the user might wish to run the cleanup job only if the original job failed n successive times with a particular error code and at a certain time of day. All other failures may be uninteresting to him. The user might also be interested in events inside the database unrelated to the scheduler. There are various kinds of information available in the database. However, the modules generating this information are unaware of precisely which parts of this information are required by the user to start his job. As in the previous case, it could be an arbitrarily complex condition based on various parts of the available information.

Figure 1B:
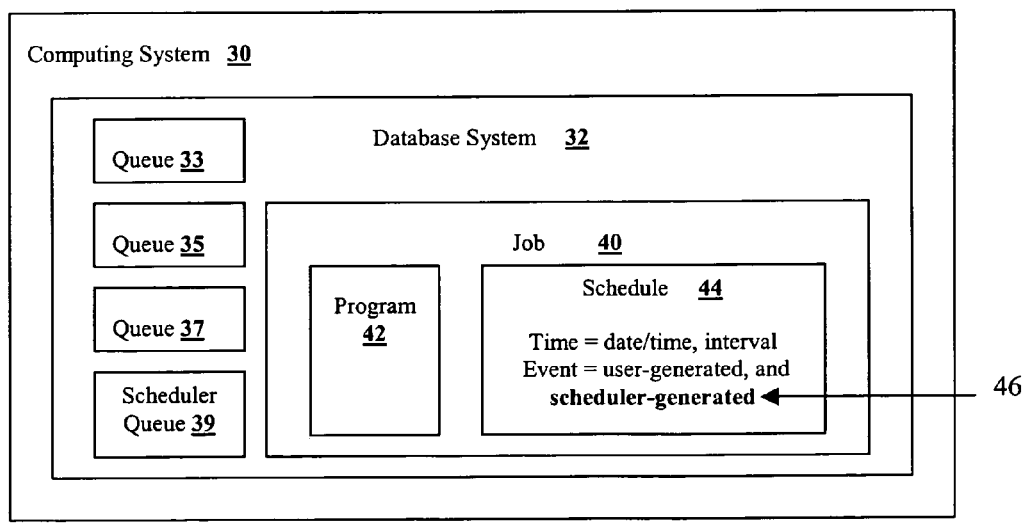
FIG. 1B is a representation of an embodiment of a job that can use state changes of other jobs and various messages passed within the database as events in the scheduler.

FIG. 1B is a representation of an embodiment displaying a scheduler within a database environment. Computing system 30 includes database system 32. Database system 32 has been adapted to manage job scheduling and therefore includes multiple jobs, one example being job 40. Job 40 includes program 42 and schedule 44. Schedule 44 can include both user-generated events and scheduler-generated events 46. Scheduler generated events are stored in the scheduler queue 39. In addition, there are other modules in the database which are enqueuing messages into their own queues (such as queue 33, queue 35, and queue 37), all of which can be used as a source of events to launch jobs.

The scheduler utilizes a message passing/queuing system. In such a system, a producer creates messages containing various pieces of information and enqueues the messages into a queue. There are other entities, called consumers or subscribers, who are interested in the messages enqueued by the producer. The consumers subscribe to the queue, and as messages are enqueued, the consumers read them and take whatever action is necessary. In some embodiments, consumers are not interested in all messages in the queue but only those that satisfy a specific Boolean condition on the contents of the message. A user may point to any queue in the database (provided he has the requisite privileges) as the source of his events (this queue is referred to as the event source queue). The user can limit, or filter, the messages by providing a Boolean condition, called the queue condition. The scheduler creates a rule-based subscription to the queue based on the queue condition on behalf of the user and launches the job when a message is enqueued that satisfies the queue condition.

When the scheduler generates events on various job state changes, it enqueues a message in its own events queue containing information about the job and the state change in question. For example, in some embodiments, upon a job failure, the message will contain the time of failure, the number of failures before this one, some indication as to what might have caused this failure (database crash or failure in the job), and the entire error stack (if an error was thrown). The user can subscribe to the scheduler queue using whatever rule he chooses to filter out messages that do not interest him; or the user can create another job that uses the scheduler queue as the event source queue and specify his queue condition to filter out unwanted messages.

The same holds true for user-generated events. The user who is the producer, that is, whose jobs generate the event, can enqueue messages into a queue containing all the information he can provide. The users who is the consumer, that is whose jobs use this queue, can provide queue conditions that filter out messages that are of no interest.

In either scheduler generated events or user generated events, the producers of the messages are unaware of which of these messages the consumers are interested in. Users are free to specify arbitrarily complex conditions on the data in the message for launching of their jobs.

The job states that can be configured as an scheduler-event include: "start of a new job" including the start of a new run or the retry after failure, "normal completion" where the job terminates normally after a hard or soft kill, "abnormal completion" including an error, slave crash, or database shutdown, "normal termination" when a job is marked a completed after reaching a maximum run time or end date, "abnormal termination" when no retry attempt has been successful, "running duration exceeded" including an event with duration that has exceeded the pre-specified duration limit, and "schedule limit exceeded" indicating the schedule limit has been exceeded for a job and the job is being rescheduled.

There are several parameters stored in the scheduler queue: event type, object information, event time stamp, event status, error message, run count, and failure count. The event type can be set to one of the job states listed above. The object information includes the job owner and job name. The event time stamp is set to the system time stamp upon the occurrence of the event. All this information is available; the user decides which of these messages are interesting to him. The user can create a job with a queue condition that can filter out the messages that are of no interest. For example, the user doesn't have to launch a cleanup job on every failure of a job but rather only on those failures that satisfy certain additional conditions. For example, those conditions may be when the failure count is more than 3 and the failure takes place during working hours on a weekday.

Event status can be a flag-based parameter. For the job start event type, the event status can indicate "normal" or "retry" based on the value of the flag. For the abnormal completion event, the event status indicates an error during job execution or a slave crash or shut down. For the abnormal termination event type, the event status can indicate stop without force, or stop with force.

The error message attribute contains, in the case of errors in job execution, the entire stack of errors that have been raised. Therefore, it is easy for the user to tell exactly which section of the code the job was in when the error was raised, and if there were multiple things that went wrong. Once again, since the error stack is included in the message, the user may structure the queue condition so that cleanup jobs will be launched only when certain very specific errors are present on the stack.

Figure 2A:
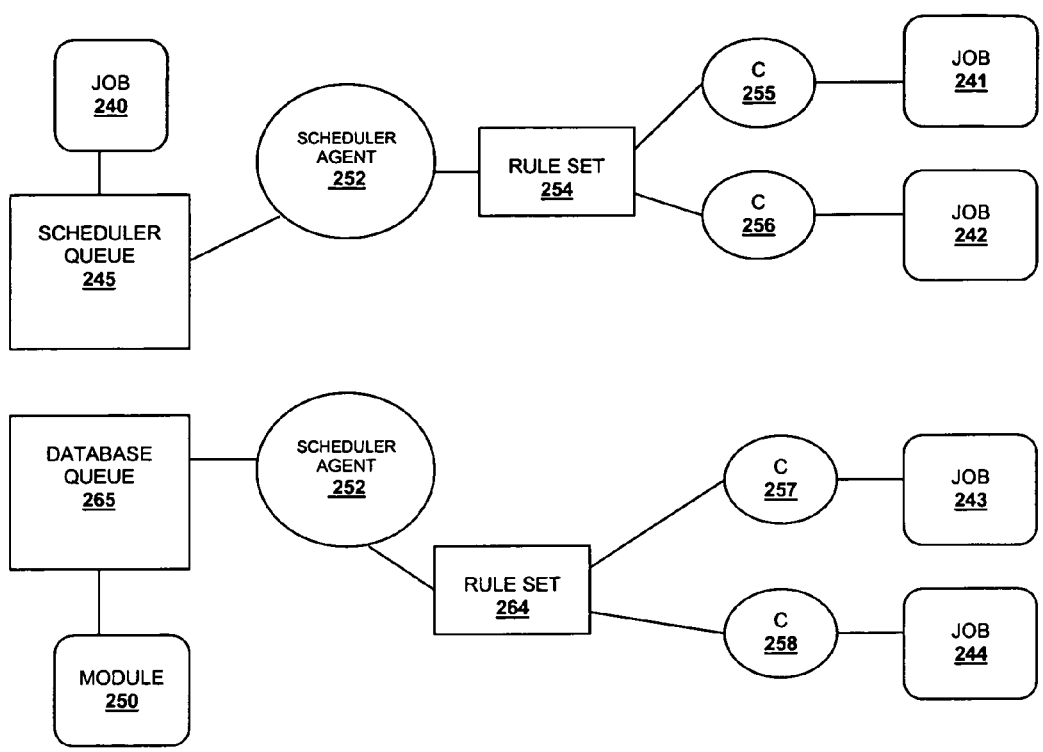
FIG. 2A is a representation of an embodiment of the relationship between jobs.

FIG. 2A is a representation of the relationship between jobs and entities that enqueue messages into queues. Job 240 enqueues a message into the scheduler events queue 245. There is also a second entity module 250 that enqueues a message into a second queue database queue 265 in the database. Note that although FIG. 2A shows only 2 queues and 2 entities to enqueue events, this simplification is only used for the discussion. There is no actual limit to the number of queues or entities in a system. Jobs 241 and 242 are interested in messages enqueued into the scheduler events queue 245. Jobs 243 and 244 are interested in messages enqueued in database queue 265. Each queue that the scheduler is interested in is subscribed to via the same agent, but with different rule sets. For example, the scheduler subscribes to the scheduler event queue using its internal agent 252 and rule set 254. The scheduler also subscribes to database queue 265 using the same agent 252 but with rule set 264. Job 241 uses condition 255 as its queue condition, job 242 uses condition 256, job 243 uses condition 257, and job 244 uses condition 258. Conditions, 255 and 256 are added to rule set 254, and conditions 257 and 258 are added to rule set 264. Note that these conditions could all be different such that, a message enqueued by job 240 into the scheduler queue 245 may cause condition 255 to evaluate to TRUE and condition 256 to evaluate to FALSE. Thus, when that message is enqueued, job 241 is triggered and job 242 is not. As a result, the same message may register as an event for one job and not for another. The entity enqueuing the message does not know which jobs will be triggered by the message or, for that matter, if any jobs will be triggered.

Figure 2B:
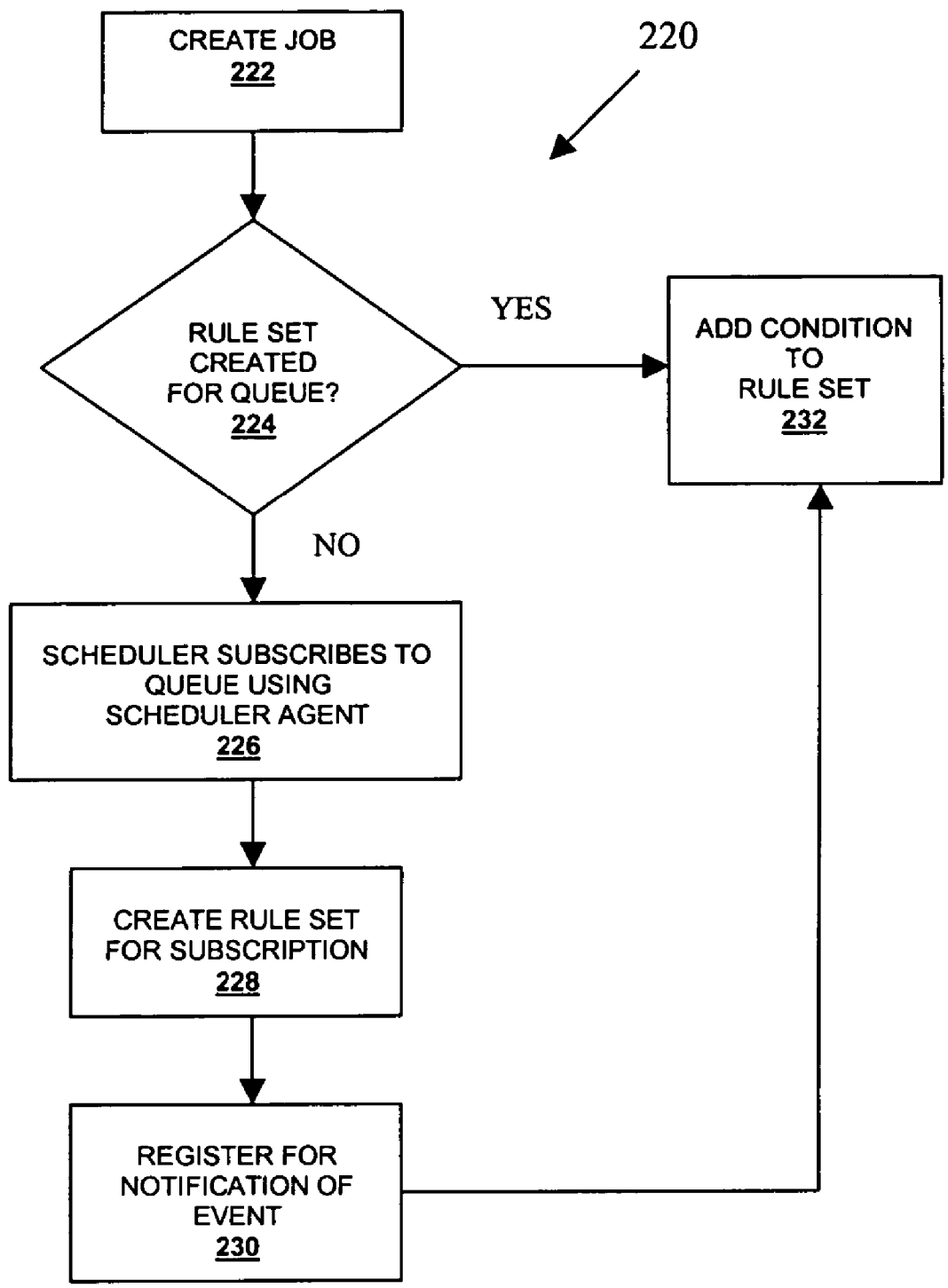
FIG. 2B is a representation of process 220, the subscribing process.

FIG. 2B is an embodiment of the subscribing process which allows a job to use another job event as a trigger, and it will be described in conjunction with FIG. 2A. A job object such as job 240 is created in process action 222. Process action 224 determines if the rule set has been created. If the rule set has already been created, a new condition, such as C 255, is added to the rule set of the existing agent 252 in process action 232. If the s rule set has not been created, one is created using the following steps. Process action 226 subscribes scheduler agent 252, to the scheduler queue of the created job. Process action 228 creates a rule set 264 for the scheduler agent 252. The scheduler agent is registered for notification of any job events enabled in the rule set in process action 230. Process action 232 adds a condition to the rule set. Once subscribed and the rule set created, the scheduler agent is notified when any rule in the rule set is satisfied.

Figure 2C:
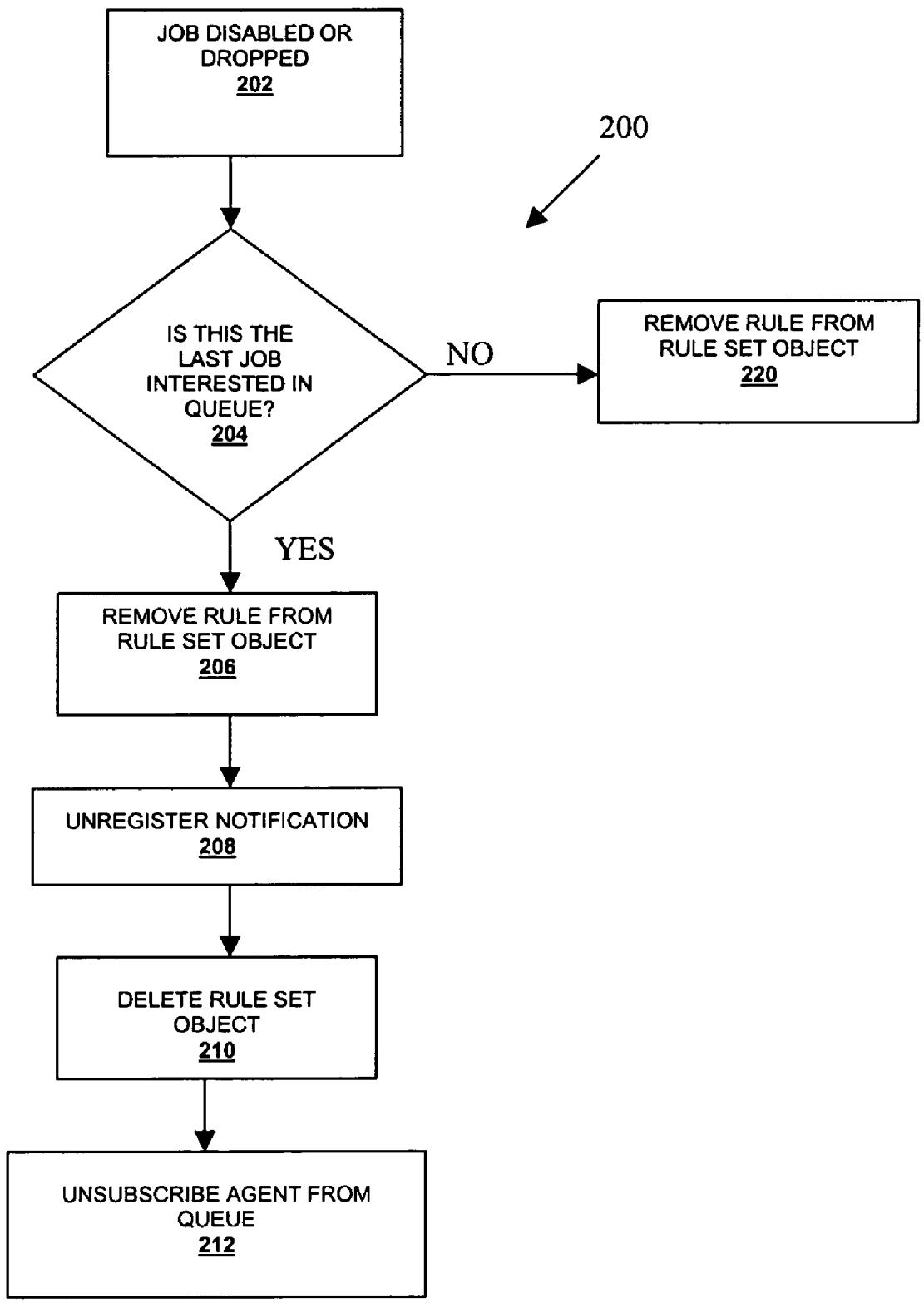
FIG. 2C is a representation of process 200, the unsubscribing process.

Process 200, shown in FIG. 2C is an embodiment of the unsubscribing process. Process action 202 received notification that the job is disabled or dropped. Recall that a user can create and/or be associated with one or more agents. Process action 204 determines if this is the last job interested in the queue. If not, process action 220 removes the corresponding rule from the rule set. If process action 204 determines that this is the last job interested in the queue, then process action 206 removes the corresponding rule from the rule set, process action 208 unregisters the notification of the events, process action 210 deletes the rule set, and process action 212 unsubscribes the user/agent from the queue.

Figure 3:
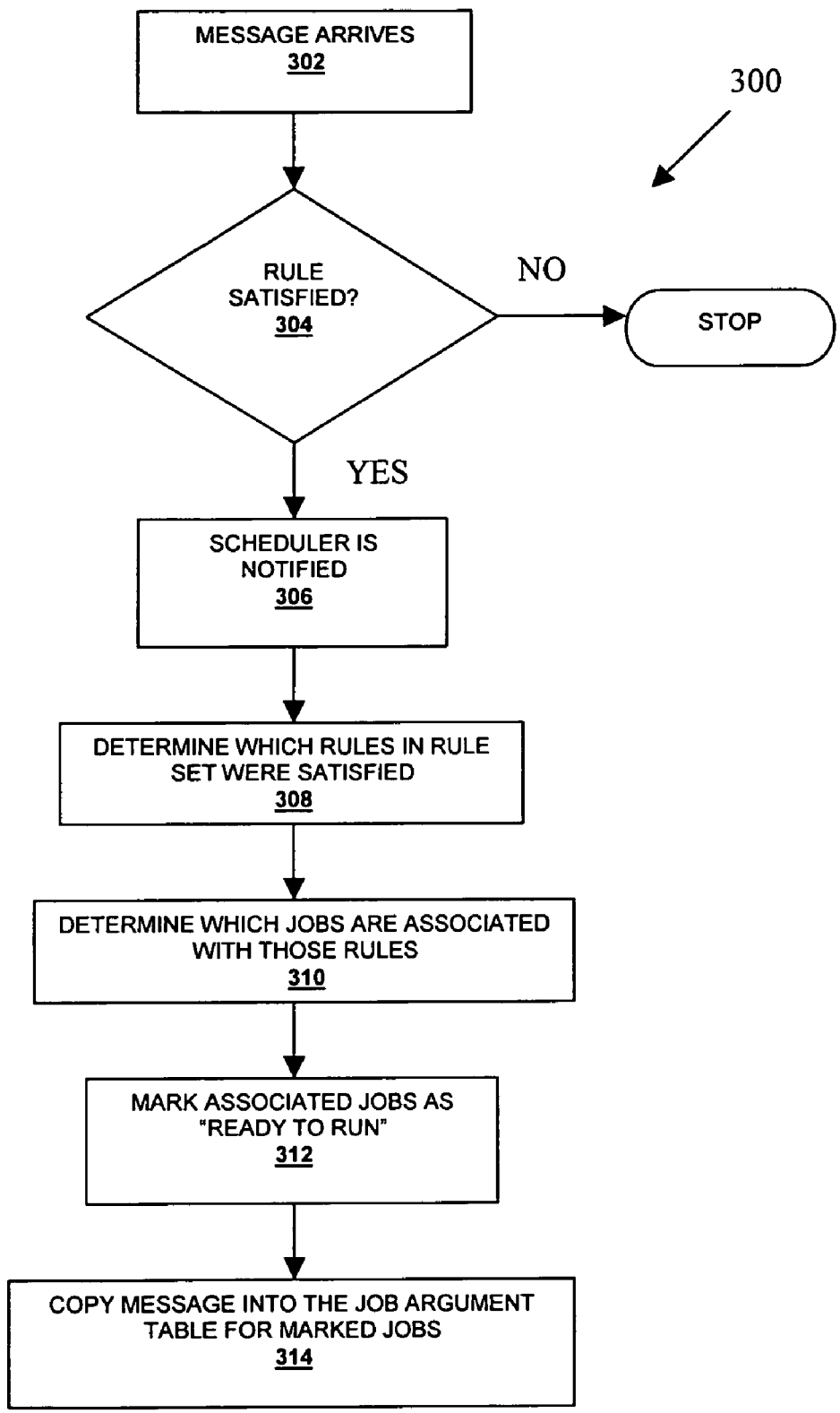
FIG. 3 is a representation of process 300, message handling process.

The scheduler manages messages and job execution. Process 300, shown in FIG. 3, is the message handling process. A message arrives in the scheduler queue in process action 302. Process action 304 determines if any rules in the rule set for a particular agent are satisfied. If no rules are satisfied, the process stops. If process 304 determines that at least one rule is satisfied, process action 306 notifies the scheduler that a rule is satisfied. Process action 308 determines which rule in the rule set has been satisfied. Process action 310 determines which job is associated with the satisfied rule. The associated job is marked as "Ready to Run" in process action 312. A message is copied into the job argument table for marked jobs in process action 314. Each job in the scheduler may possess arguments. The arguments for a job are stored in the job arguments table and passed to the job upon execution.

Figure 4:
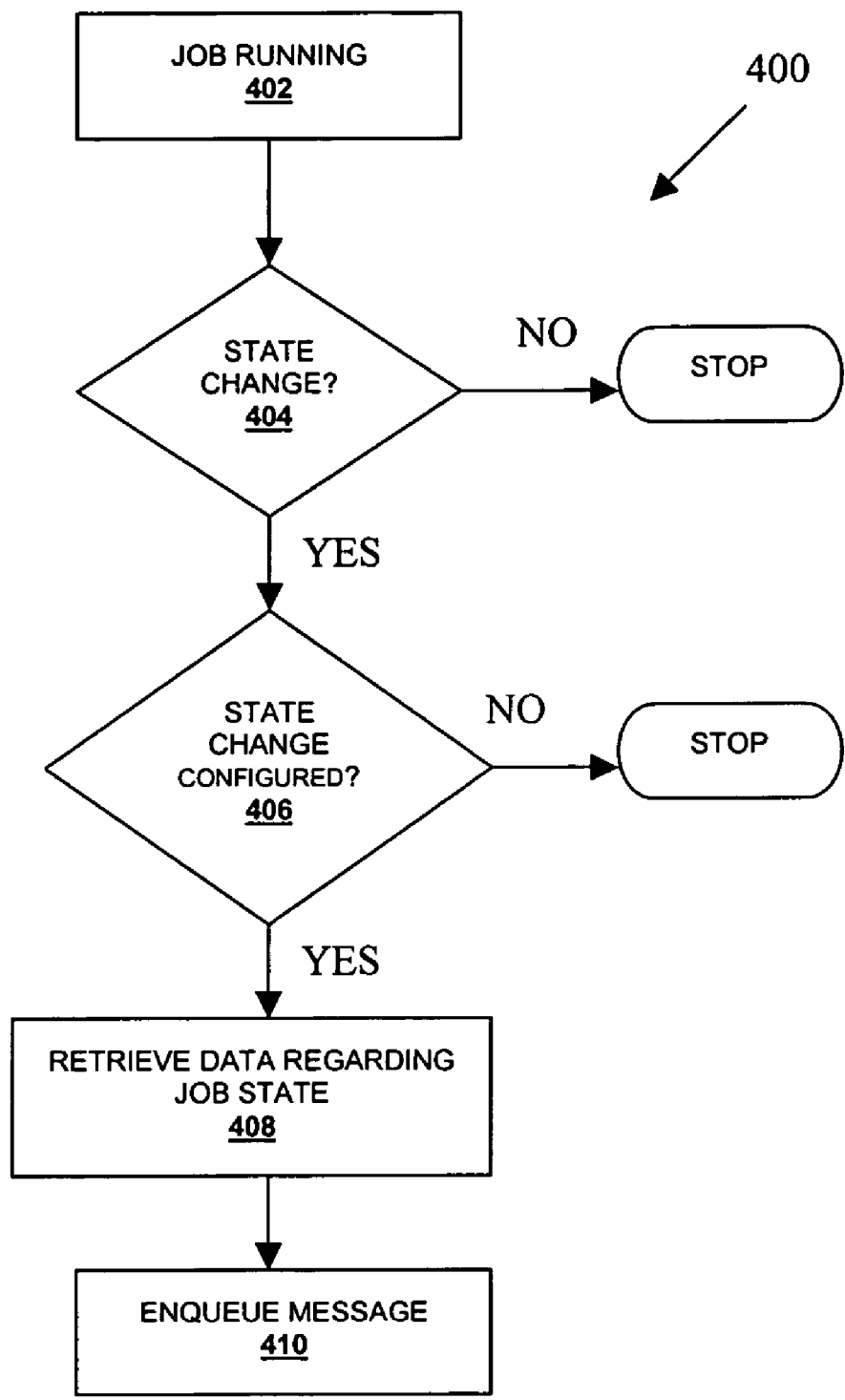
FIG. 4 is a representation of process 400, the job state enqueuing process.

Process 400, shown in FIG. 4, is the standard job state enqueuing process. This process brings the enabled state changes to the attention of any subscribers. In process 402 a job is running. Process action 404 determines if the state of the job has changed. If the state of the job has not changed, then process 400 stops. If the state of the job has changed, process action 406 determines if the state change has been enabled/configured for enqueuing. If the change has not been configured (i.e., there is no interest in the state change) process 400 stops. If the state has been enabled, process action 408 retrieves all the job state data. Process action 410 enqueues the state change message including the job state data in the scheduler queue. Note that any message enqueued by the scheduler goes into the scheduler queue. However other entities in the database enqueue messages into other queues in the database and any of these queues can be used as source of events.

Figure 5:
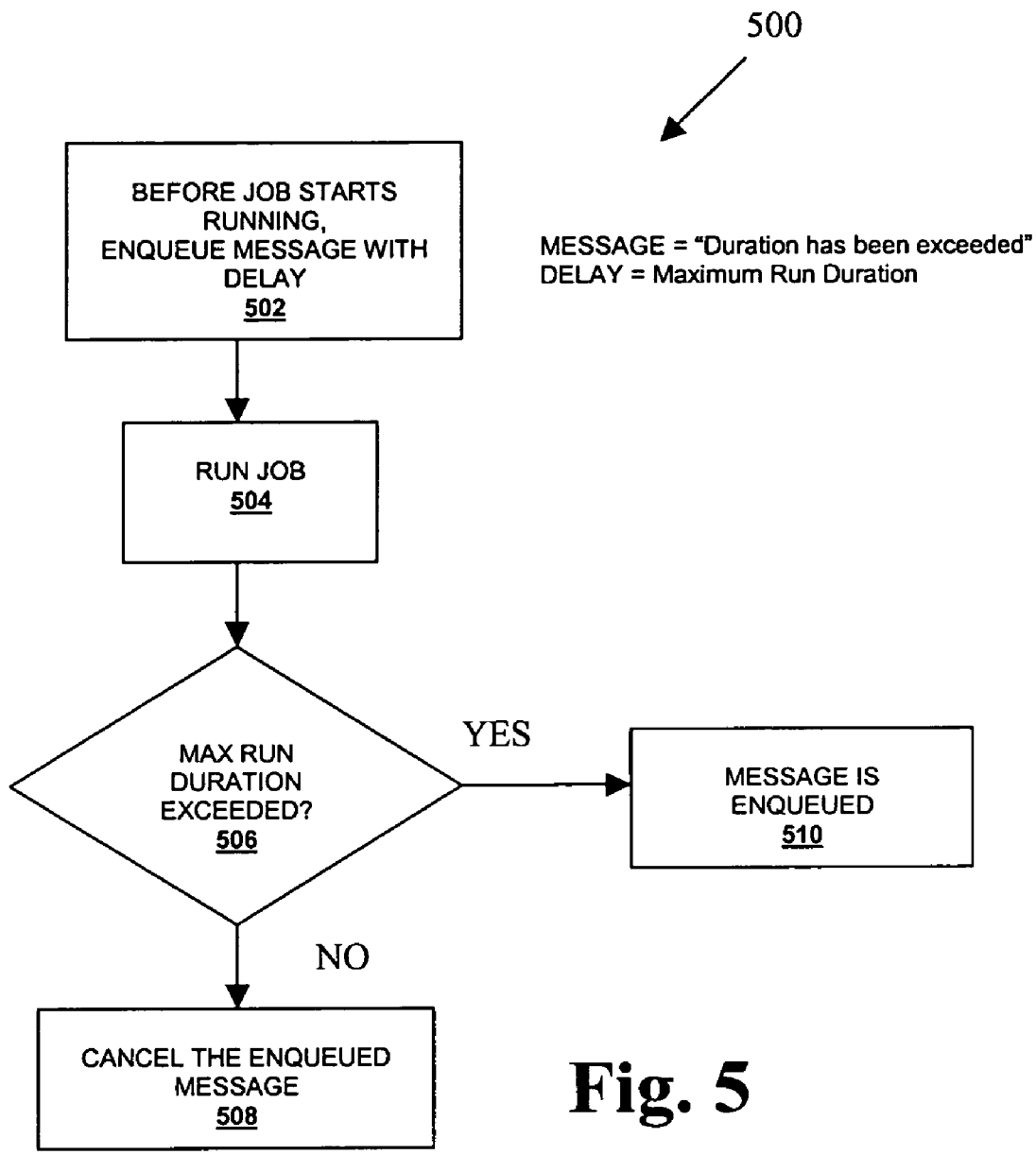
FIG. 5 is a representation of process 500, the enqueuing maximum run duration exceeded process.
Figure 6A:
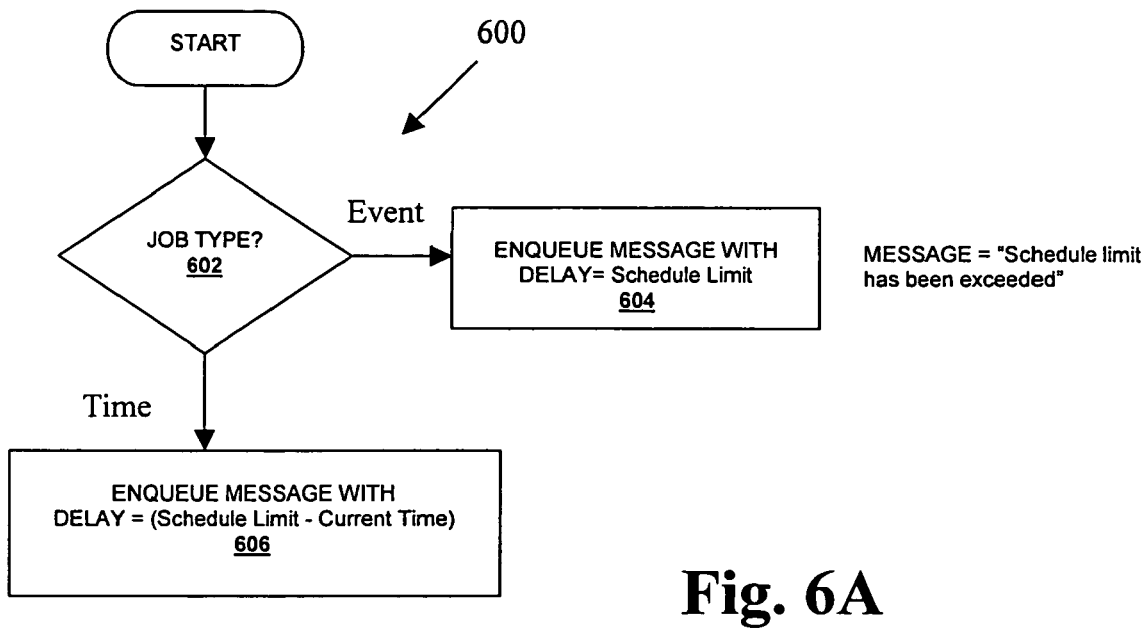
FIG. 6A is a representation of process 600, the enqueuing schedule limit exceeded process.
Figure 6B:
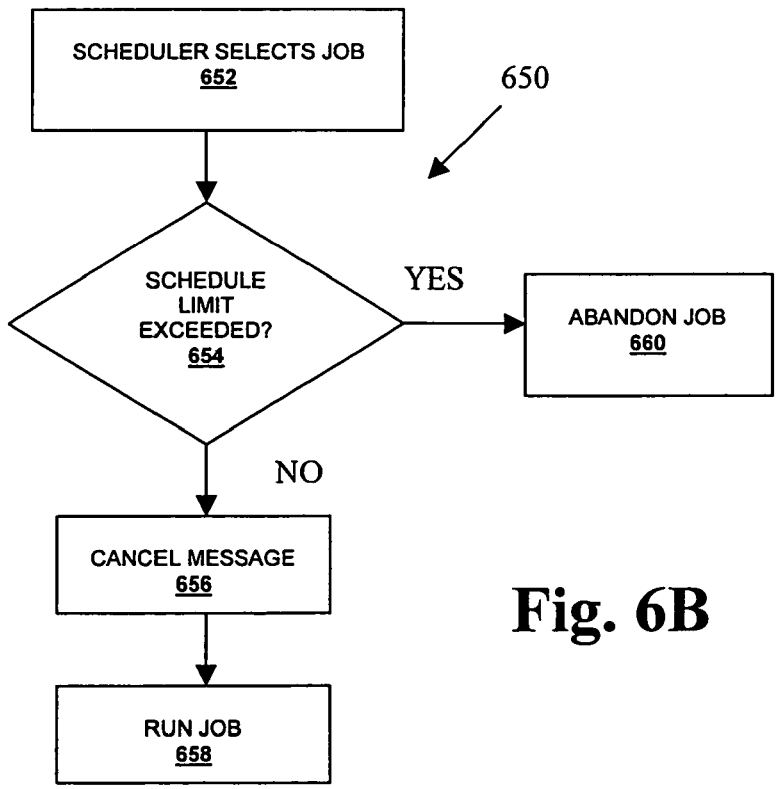
FIG. 6B is a representation of process 650, the running the schedule limited job process.
Figure 7:
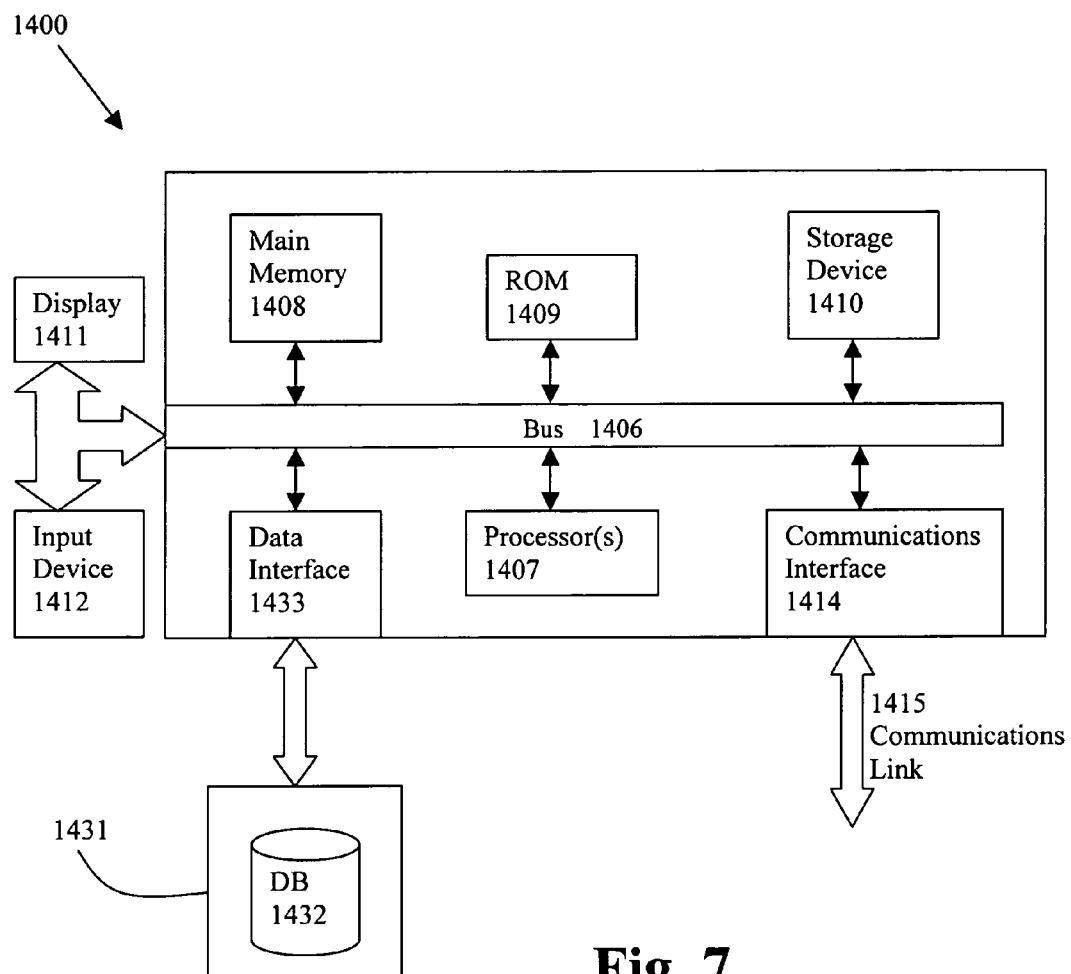
FIG. 7 is a representation of a system that can provide event based job scheduling.

FIGS. 5, 6A, and 6B are example embodiments of enqueuing job states that require additional logic. FIG. 5 shows the "Duration has been exceeded" message enqueuing process and FIGS. 6A and 6B show the "Schedule limit has been exceeded" message enqueuing process.

In FIG. 5, process action 502 enqueues the message "Duration has been exceeded" and sets a delay parameter prior to the job start. The delay set is the maximum run duration. Process action 504 runs the job. Process action 506 determines if the maximum duration of the delay has been exceeded. If yes, the message that was enqueued with delay in process action 502 is permitted to enqueue in process action 510. If the maximum duration has not been exceeded, the enqueued message is canceled in process action 508.

In FIGS. 6A and 6B, illustrate an embodiment of enqueuing the "Schedule limit has been exceeded" message. FIG. 6A illustrates the set up portion. Process action 602 determines which type of job scheduling has been configured-time or event. If the job scheduling type is time then a message is enqueued and a delay parameter set to the difference between the schedule limit and the current time. If the job schedule type is determined to be event, a message is enqueued with a delay parameter set to the schedule limit. The message in either instance is "Schedule limit has been exceeded."

FIG. 6B illustrates the run time portion of this message enqueuing process. In process action 652, the scheduler selects a job. Process action 654 determines if the schedule limit for the job has been exceeded. If the schedule limit has been exceeded, the job is abandoned in process action 660. If the schedule limit has not been exceeded, the message enqueued in process 600 is canceled in process action 656, and the job is run in process action 658.

System Architecture Overview

The execution of the sequences of instructions required to practice the embodiments may be performed by a computer system 1400 as shown in FIG. 4. In an embodiment, execution of the sequences of instructions is performed by a single computer system 1400. According to other embodiments, two or more computer systems 1400 coupled by a communication link 1415 may perform the sequence of instructions in coordination with one another. Although a description of only one computer system 1400 will be presented below, however, it should be understood that any number of computer systems 1400 may be employed to practice the embodiments.

A computer system 1400 according to an embodiment will now be described with reference to FIG. 4, which is a block diagram of the functional components of a computer system 1400. As used herein, the term computer system 1400 is broadly used to describe any computing device that can store and independently run one or more programs.

Each computer system 1400 may include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 may be a LAN, in which case the communication interface 1414 may be a LAN card, or the communication link 1415 may be a PSTN, in which case the communication interface 1414 may be an integrated services digital network (ISDN) card or a modem, or the communication link 1415 may be the Internet, in which case the communication interface 1414 may be a dial-up, cable or wireless modem.

A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions. Thus, embodiments are not limited to any specific combination of hardware circuitry and/or software.

The term "computer-usable medium," as used herein, refers to any medium that provides information or is usable by the processor(s) 1407. Such a medium may take many forms, including, but not limited to, non-volatile, volatile and transmission media. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408. Transmission media includes coaxial cables, copper wire and fiber optics, including the wires that comprise the bus 1406. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the embodiments have been described with reference to specific elements thereof. It will, however, be evident that various modifications and changes may be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

We claim:

1. A method of job scheduling by a database system comprising:
    creating a first job;
    associating a scheduler agent to a queue comprising a queue message body;
    creating a first rule associated with the scheduler agent, the first rule comprised of one or more conditions based at least in part upon a state change data in the queued message body;
    registering the first job with the scheduler agent for notification of an event;
    scheduling the event to trigger execution of the first job by using the first rule, the event being based at least in part upon the state change data in the queued message body, wherein the state change data is associated with the state change of a second job;
    executing, by using a processor, the first job based at least in part upon the state change data; and
    storing the state change data in a non-transitory computer-usable medium or displaying the state change data on a display device.

2. The method of claim 1, wherein the act of associating comprises subscribing the scheduler agent to the queue.

3. The method of claim 2, wherein the one or more conditions filter information from the queued message body.

4. The method of claim 2, wherein the queue is a database queue, the database queue storing messages from a database entity.

5. The method of claim 4, wherein the database entity is a module.

6. The method of claim 2, wherein the queue is a scheduler queue, the scheduler queue storing messages from one or more jobs.

7. The method of claim 2 wherein a first one and a second one of the one or more conditions are based at least in part upon a first message, and upon enqueuing of the first message, the first condition is true and triggers execution of a job and the second condition is false and does not trigger execution of a job.

8. The method of claim 1, wherein the message body includes job state, job owner, job name, event time stamp, event status, error message, run count, and failure count.

9. A computer program product embodied on a computer readable storage medium, the computer readable storage medium having stored thereon a sequence of instructions which, when executed by a processor, causes the processor to execute a method of job scheduling by a database system, the method comprising:
    creating a first job;
    associating a scheduler agent to a queue comprising a queue message body;
    creating a first rule associated with the scheduler agent, the first rule comprised of one or more conditions based at least in part upon a state change data in the queued message body;
    registering the first job with the scheduler agent for notification of an event;
    scheduling the event to trigger execution of the first job by using the first rule, the event being based at least in part upon the state change data in the queued message body, wherein the state change data is associated with the state change of a second job;

executing the first job based at least in part upon the event; and storing the state change data or displaying the state change data on a display device.

10. The computer program product of claim 9, wherein the act of associating comprises subscribing the scheduler agent to the queue.

11. The computer program product of claim 10, wherein the one or more conditions filter information from the queued message body.

12. The computer program product of claim 10, wherein the queue is a database queue, the database queue storing messages from a database entity.

13. The computer program product of claim 12, wherein the database entity is a module.

14. The computer program product of claim 10, wherein the queue is a scheduler queue, the scheduler queue storing messages from one or more jobs.

15. The computer program product of claim 10 wherein a first one and a second one of the one or more conditions are based at least in part upon a first message, and upon enqueuing of the first message, the first condition is true and triggers execution of a job and the second condition is false and does not trigger execution of a job.

16. The computer program product of claim 9, wherein the message body includes job state, job owner, job name, event time stamp, event status, error message, run count, and failure count.

17. A job scheduling system comprising:

one or more database queues created for purposes other than job scheduling comprising a first set of messages based at least in part upon events in the database environment;

a scheduler queue comprising a second set of messages based at least in part upon a state of one or more jobs in the database environment; and a rules engine configured to create a plurality of rule sets based at least in part upon information contained in a message body of the first and second set of messages, wherein an event can be scheduled by a scheduling agent to trigger execution of a first job by using a first rule from the plurality of rule sets, the event being based at least in part upon the information contained in the second set of messages, the first job being registered with the scheduler agent for notification of the event, and the second set of messages is associated with the state of a second job.

18. The system of claim 17, wherein the rule sets comprise one or more conditions, the one or more conditions based at least in part upon the message body of the first and second set of messages and configured to trigger one of the one or more jobs to execute upon the condition being satisfied.

19. The system of claim 18, wherein the message body of the first and second set of messages comprises information regarding a job state of one of the one or more jobs.

20. The system of claim 18, wherein the conditions can be compound Boolean statements including multiple database events.

21. The system of claim 18, wherein a first condition based at least in part upon a first message body can evaluate to true and a second condition based at least in part upon the first message body can evaluate to false upon the enqueuing of the first message.

22. The system of claim 17 wherein the one or more database queues are unaware of a subscription.

23. The system of claim 17, wherein the rules are capable of utilizing all Boolean operators.

\* \* \* \* \*